Dec. 5, 1933.     J. R. GAMMETER     1,938,420
APPARATUS FOR MAKING DIPPED RUBBER GOODS
Original Filed Jan. 20, 1930     2 Sheets-Sheet 1
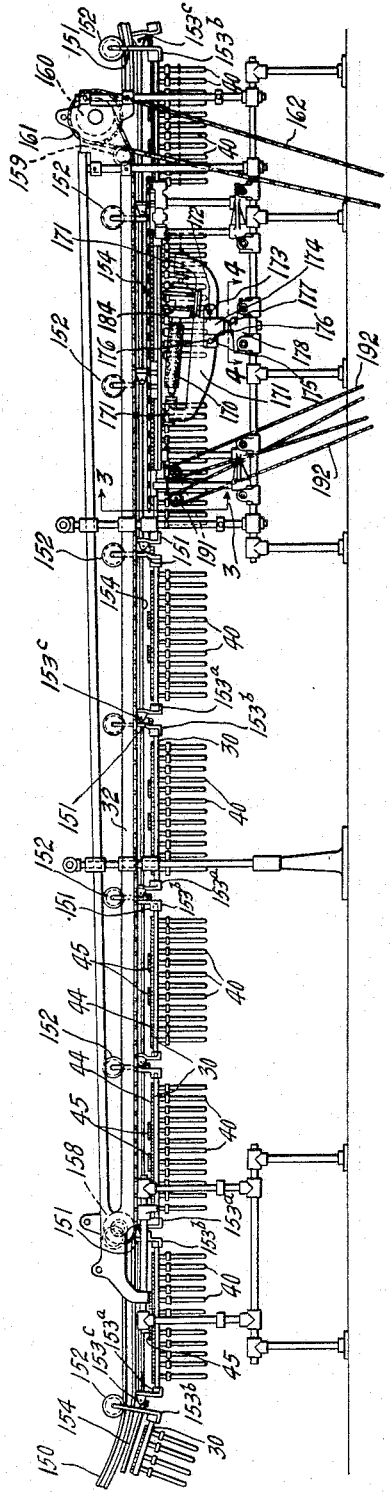
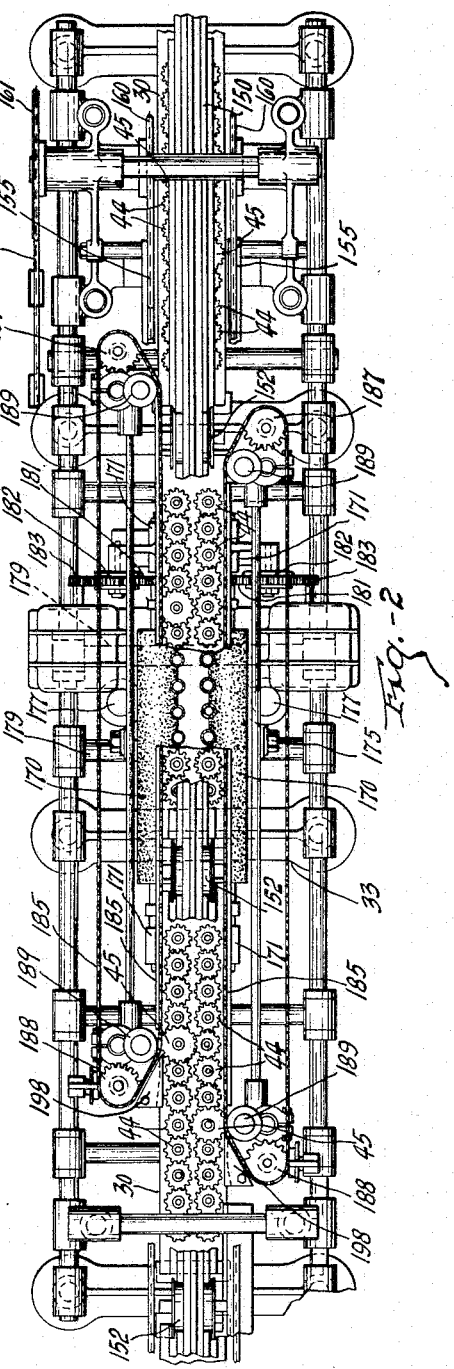
INVENTOR.
JOHN R. GAMMETER
BY Ely & Barrow
ATTORNEYS.

Dec. 5, 1933.                    J. R. GAMMETER                    1,938,420
                    APPARATUS FOR MAKING DIPPED RUBBER GOODS
                    Original Filed Jan. 20, 1930        2 Sheets-Sheet 2
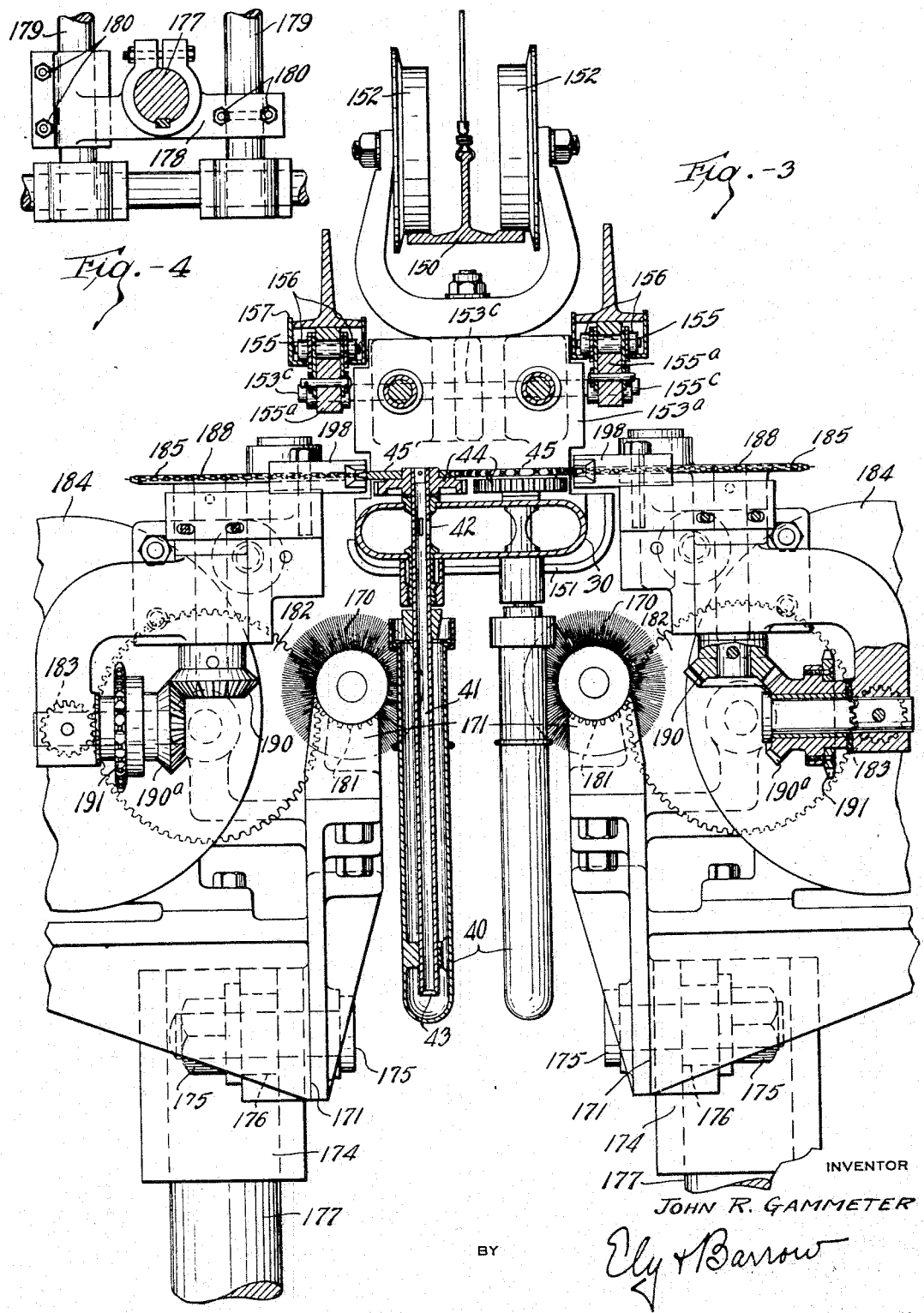
INVENTOR
JOHN R. GAMMETER
BY
ATTORNEYS Patented Dec. 5, 1933

1,938,420

UNITED STATES PATENT OFFICE 1,938,420

APPARATUS FOR MAKING DIPPED RUBBER GOODS

John R. Gammeter, Akron, Ohio

Original application January 20, 1930, Serial No. 422,016. Divided and this application May 23, 1932. Serial No. 612,967

4 Claims. (Cl. 18—2)

This invention relates to apparatus for making dipped rubber goods, and more especially it relates to mechanism for rolling rings or beads on the open ends of dipped rubber goods such as nipples, finger cots, and the like.

The chief object of the invention is to provide improved means for rotating the forms on which the dipped rubber articles are mounted, during the forming of the bead on the article. More specifically the invention aims to provide mechanism for positively driving the forms to impart rotary movement thereto as beads are rolled on the articles on the forms.

The invention is disclosed in my co-pending application for Letters Patent for method and apparatus for making dipped rubber articles, Serial No. 422,016, filed January 20, 1930, of which the present application is a division.

Of the accompanying drawings,

Figure 1 is a side elevation of a portion of a dipping form conveyor, including bead rolling apparatus;

Figure 2 is a plan view, on a larger scale, of the bead rolling apparatus;

Figure 3 is a section, on a larger scale, on the line 3—3 of Figure 1; and

Figure 4 is a section, on a larger scale, on the line 4—4 of Figure 1.

Referring to the drawings, the apparatus embodying the invention comprises dipping form racks 30, a conveyor 32 for receiving and carrying said racks, and bead rolling mechanism 33 disposed along the course of the conveyor and adapted to operate upon the work on the dipping forms carried by the racks 30.

The dipping form racks 30 are hollow and may be made from tubular metal such as aluminum. Each rack contains two rows of hollow dipping forms 40, 40 which may be of glass, metal or other suitable material and which preferably have relatively thin walls. The forms are secured on central tubular shafts 41, 41 (see Figure 3) which are journaled in the racks 30, these shafts having one or more inlet openings therein within the hollow rack as indicated at 42 and also one or more outlets 43 within the forms 40 preferably adjacent the tops thereof. On the backs of the racks shafts 41 have gears 44 secured thereon the gears for each row of forms on each rack being meshed in a train (see Figure 2) and one gear of each train having a sprocket 45 thereon for driving each train of gears, said sprocket being off-set on the racks so as not to interfere with each other.

The conveyor 32 may comprise an overhead track 150 on which rack carriers 151 having wheels 152 thereon may roll to suspend the carriers from the track, said carriers being provided with suitable brackets 153$^a$ and 153$^b$ on the bottom thereof for engaging adjacent ends of the racks 30 to support a series of the racks on the carriers in inverted relation as shown, the bracket 153$^b$ being hinged to bracket 153$^a$ as at 153$^c$. The carriers 151 are connected by rods 154, 154 fixed to brackets 153$^a$ of each carrier and secured to bracket 153$^b$ on the next carrier thereto.

For moving the connected carriers constituting the rack conveyor along the path defined by track 150, drive chains 155, 155 provided with rollers 156 engaged on tracks 157, 157 are adapted to engage with a portion of the conveyor, these chains having lugs 155$^a$, 155$^a$ thereon for engaging lugs such as may be provided by projecting ends of the hinge pins 153$^c$. Chains 155 are trained over suitable idler sprockets 158 and 159 and over drive sprocket 160, the latter being driven by a sprocket 161 over which is trained a drive chain 162 that is driven by any suitable source of power (not shown).

The bead roller comprises a pair of inclined rotary brushes 170, 170 arranged at the sides of conveyor 32, these brushes being journaled in brackets 171, 171 pivoted on pins 172, 172 and retained therein by nuts 173. Bolts 175 are secured in brackets 171, 171 extending through an arcuate slot 176, in brackets 174 to provide means for securing the brackets 171 at adjusted inclinations on brackets 174. Brackets 174 have posts 177 extending downwardly therefrom by which they are mounted for vertical adjustment in brackets 178 and brackets 178 are in turn horizontally adjustable transversely of the conveyor on rods 179, 179, bolts 180, 180 being adapted to secure said brackets in adjusted positions. The brushes 170 are accordingly adjustable as to inclination, as to height and as to the degree of pressure against or contact with the forms to roll the rings on the rubber goods on the forms as required.

The brushes are arranged to be rotated so that each brush wipes downwardly of the inverted forms (Figure 3) by gears 181 thereon meshed with gears 182 in turn meshed with pinions 183 on the shafts of motors 184 all mounted on brackets 171.

The forms 31 are arranged to be rotated on the racks 30 as has been described and means to rotate the forms on the racks when in contact with the bead rolling brushes are provided at each side of the conveyor 32. This means may comprise chains 185 arranged at the sides of the conveyor to be engaged by sprockets 45 on the bottoms of the inverted racks. These chains may be fixed, in which event the rate of rotation of the forms on the racks is limited by the speed of travel of the racks on the conveyor or these chains may be driven to provide an increased rate of form rotation. To provide for driving the chains they may be made endless and trained over idle sprockets 187 and drive sprockets 188 with rollers 189 holding the the stretches of the chain straight which are to be engaged by the sprockets 45 on the form racks. Sprockets 188 may be driven by gears 190 meshed with gear 190ᵃ driven in turn by sprocket 191, drive chains 192 for sprockets 191 being driven by any suitable source of power (not shown). Suitable guide members 198 may be provided at the entering end of the bead roller to guide sprockets 45 into proper registry with chains 185.

In the operation of the apparatus described, the forms 40 are coated with a thin layer of unvulcanized rubber composition which has been applied to the forms by dipping the latter in a viscous solution of rubber such as natural or artificial aqueous dispersions of rubber, or rubber dissolved in naphtha, benzol or other solvent. The dipping operation may be effected while the forms are on the conveyor, or the dipped forms may be placed on the conveyor after a previous dipping.

Conveyor 32 passes the forms through the bead roller 33 in which the forms are rotated on the racks while passing in contact with the brushes 170 which progressively roll the rubber film upon themselves downwardly from the bottoms of the inverted forms, the height and inclination of the brushes being set to roll the articles to predetermined finished lengths. The indirect drive employed for the forms through the chains 185, sprockets 45, and trains of gears 44, provides for positive drive of the forms to insure perfect rolling and eliminates rapid wear and heavy replacements in rack equipment such as results from the pressure required for direct frictional drive on the forms as has been heretofore employed to some extent in the art of making dipped goods.

Modifications of the invention may be resorted to without departing from the spirit thereof or the scope of the appended claims.

What is claimed is:

1. Apparatus for making dipped rubber goods comprising racks, two rows of dipping forms rotatably mounted on the racks, gears on the bottoms of the racks connected to the forms for rotating the same, the gears in each row of forms being arranged in trains, a sprocket connected to one gear in each train, a conveyor for passing the racks through an apparatus for treating the forms, and chains at the sides of the conveyor adapted to be engaged by said sprockets as the racks pass through said apparatus to rotate the forms in the apparatus.

2. Apparatus for making dipped rubber goods comprising racks, a row of dipping forms rotatably mounted on the racks, gears on the bottom of the racks connected to the forms for rotating the same, the gears being arranged in a train, a sprocket connected to one gear in said train, a conveyor for passing the racks through an apparatus for treating the forms, and a chain associated with the conveyor adapted to be engaged by said sprocket as the racks pass through said apparatus to rotate the forms in the apparatus.

3. Apparatus for making dipped rubber goods comprising racks, a row of dipping forms rotatably mounted on the racks, gears on the bottoms of the racks connected to the forms for rotating the same, the gears being arranged in a train, drive means connected to one gear in said train, a conveyor for passing the racks through an apparatus for treating the forms, and means associated with the conveyor adapted to be engaged by said drive means as the racks pass through said apparatus to rotate the forms in the apparatus.

4. Apparatus for making dipped rubber goods comprising a carrier rack having a row of dipping forms on the face of the rack, spindles extending through the rack on which said dipping forms are secured, gears secured to the spindles on the back of the rack, said gears being meshed in a train, a rotatable element for driving one of said spindles and located on the back of the rack, means for conveying said racks along a certain path, a rotary ring-rolling brush associated with said conveying means to contact the forms as they pass along said path and means associated with said conveying means and said brush for engaging and rotating said rotatable element as the forms pass in contact with said brush and through said rotatable element to rotate said train of gears which in turn rotate said spindles in the racks which in turn rotate said forms.

JOHN R. GAMMETER.